(12) United States Patent
Kawai

(10) Patent No.: US 8,715,841 B2
(45) Date of Patent: *May 6, 2014

(54) GLASS SUBSTRATE FOR INFORMATION RECORDING MEDIUM AND INFORMATION RECORDING MEDIUM

(76) Inventor: Hideki Kawai, Kobe (JP)

( * ) Notice: Subject to any disclaimer, the term of this patent is extended or adjusted under 35 U.S.C. 154(b) by 504 days.

This patent is subject to a terminal disclaimer.

(21) Appl. No.: 13/003,699

(22) PCT Filed: Jul. 3, 2009

(86) PCT No.: PCT/JP2009/062187
§ 371 (c)(1),
(2), (4) Date: Jan. 11, 2011

(87) PCT Pub. No.: WO2010/007903
PCT Pub. Date: Jan. 21, 2010

(65) Prior Publication Data
US 2011/0111161 A1  May 12, 2011

(30) Foreign Application Priority Data
Jul. 14, 2008 (JP) .................................. 2008-182491

(51) Int. Cl.
*G11B 5/33* (2006.01)
*C03B 29/00* (2006.01)
*B05D 5/12* (2006.01)

(52) U.S. Cl.
USPC .......... 428/846.9; 428/426; 360/135; 65/33.8

(58) Field of Classification Search
USPC ........... 428/141, 410, 426, 846.9, 220; 501/4, 501/7, 63, 69, 66; 65/66, 33.8, 134.4, 65/134.5, 346; 360/135; 427/131
See application file for complete search history.

(56) References Cited

U.S. PATENT DOCUMENTS

| | | | |
|---|---|---|---|
| 2002/0010066 A1* | 1/2002 | Nakashima et al. | 501/69 |
| 2002/0092325 A1* | 7/2002 | Muschik et al. | 65/134.3 |
| 2005/0250639 A1* | 11/2005 | Siebers et al. | 501/68 |
| 2007/0004578 A1* | 1/2007 | Monique Comte | 501/4 |
| 2007/0259767 A1* | 11/2007 | Siebers et al. | 501/59 |
| 2009/0142568 A1* | 6/2009 | Dejneka et al. | 428/220 |
| 2009/0143214 A1* | 6/2009 | Niida et al. | 501/56 |
| 2009/0162608 A1* | 6/2009 | Yagi et al. | 428/141 |

FOREIGN PATENT DOCUMENTS

| | | |
|---|---|---|
| DE | 4206268 A | 11/1992 |
| JP | 62-187140 A | 8/1987 |
| JP | 05-32431 A | 2/1993 |
| JP | 05-306140 A | 11/1993 |
| JP | 08-321034 | 12/1996 |
| JP | 11-314931 A | 11/1999 |
| JP | 2000-128549 | 5/2000 |
| WO | WO 2007/020825 A1 | 2/2007 |

OTHER PUBLICATIONS

Translation Hiroharu et al machine translation JP 05-032431, Sep. 1993.*
International Search Report in International Application No. PCT/JP2009/062187, dated Sep. 29, 2009, 2 pages.

* cited by examiner

*Primary Examiner* — Kevin M. Bernatz
*Assistant Examiner* — Louis Falasco
(74) *Attorney, Agent, or Firm* — Brinks Gilson & Lione

(57) ABSTRACT

A glass substrate for information recording medium, said glass substrate being composed of an aluminosilicate glass containing 60-75% by mass of $SiO_2$, 5-18% by mass of $Al_2O_3$, 3-10% by mass of $Li_2O$, 3-15% by mass of $Na_2O$ and 0.5-8% by mass of $ZrO_2$ relative to the entire glass components. The glass substrate for information recording medium contains neither As (arsenic) nor Sb (antimony), while containing at least one substance selected from the group consisting of $SO_3$ (sulfurous acid), F (fluorine), Cl (chlorine), Br (bromine) and I (iodine), as a refining agent. The molar ratio of the total amount of the refining agent to the amount of $ZrO_2$ is within the range of 0.05-0.50.

2 Claims, No Drawings

GLASS SUBSTRATE FOR INFORMATION RECORDING MEDIUM AND INFORMATION RECORDING MEDIUM

This application is a National Stage of International Application PCT/JP2009/062187 filed with Japanese Patent Office on Jul. 3, 2009.

TECHNICAL FIELD

The present invention relates to a glass substrate for an information recording medium such as a magnetic disk and an information recording medium using the same, and more specifically to a glass substrate for an information recording medium made of aluminosilicate glass and an information recording medium using the same.

BACKGROUND

Of information recording media having a recording layer utilizing magnetic, optical, or magneto-optical properties, magnetic disks are available as typical media. Conventionally, as magnetic disk substrates, aluminum substrates have been widely used. However, over recent years, with the demand for the reduction of magnetic head floating amount for recording density enhancement, glass substrates have been increasingly used, which glass substrates exhibit superior surface flatness to aluminum substrates and have less surface defects. Of these, preferably used are glass substrates formed of aluminosilicate glass capable of strengthening substrates by chemical strengthening treatment by ion exchange, because of their enhanced impact resistance and vibration resistance.

In such a glass substrate for an information recording medium, to be capable of high density recording with reduced surface defects, it is necessary that gas bubbles generated in the melting process of glass are allowed to be present in a glass substrate at as lowest level as possible. Conventionally, a method has been commonly employed in which $As_2O_3$ and $Sb_2O_3$ are contained in a glass component as fining agents, whereby gas bubbles in molten glass are removed (clarified) (for example, refer to Patent Document 1).

However, since $As_2O_3$ and $Sb_2O_3$ are toxic, from the environmental and health viewpoints, a tendency to regulate the usage thereof is being widespread. Therefore, studies have been made to realize a method to remove gas bubbles in the molten glass without using $As_2O_3$ or $Sb_2O_3$ serving as fining agents is studied (for example, Patent Document 2), and proposed is a method to remove gas bubbles by depressurizing molten glass.

PRIOR ART DOCUMENTS

Patent Documents

Patent Document 1: Unexamined Japanese Patent Application Publication No. 8-321034
Patent Document 2: Patent Document 1: Unexamined Japanese Patent Application Publication No. 2000-128549

BRIEF DESCRIPTION OF THE INVENTION

Problems to be Solved by the Invention

However, according to the method described in Patent Document 2, there have been such problems that a complex process and a special decompression degassing apparatus are required and also a glass component tends to be changed by volatilization of the glass component with pressure reduction.

In view of the above technological problems, the present invention was conceived. An object of the present invention is to provide a glass substrate for an information recording medium with sufficiently removed gas bubbles in which neither As (arsenic) nor Sb (antimony) element is contained; and an information recording medium using the same.

Means to Solve the Problems

To solve the above problems, the present invention has the following features.

Item 1. A glass substrate for an information recording medium made of aluminosilicate glass containing 60% to 75% by mass of $SiO_2$, 5% to 18% by mass of $Al_2O_3$, 3% to 10% by mass of $Li_2O$, 3% to 15% by mass of $Na_2O$, and 0.5% to 8% by mass of $ZrO_2$ with respect to whole glass components, comprising:
neither As (arsenic) element nor Sb (antimony) element;
at least one type selected from the group consisting of $SO_3$ (sulfurous acid), F (fluorine), Cl (chlorine), Br (bromine), and I (iodine), as fining agent,
wherein a molar ratio of a whole amount of the fining agent to the $ZrO_2$, which is (the whole amount of the fining agent)/$ZrO_2$, is within a range of 0.05 to 0.50.

Item 2. The glass substrate for an information recording medium of item 1, wherein the fining agent contains $SO_3$ (sulfurous acid).

Item 3. The glass substrate for an information recording medium of item 1 or 2, wherein a total content of the fining agent is 1% by mass or less with respect to the whole glass components.

Item 4. The glass substrate for an information recording medium of any one of item 1 to 3, wherein the glass substrate for an information recording medium is chemically strengthened by ion exchange.

Item 5. An information recording medium, comprising:
a recording layer provided on the glass substrate for an information recording medium of any one of items 1 to 4.

Advantages of the Invention

According to the present invention, since predetermined polyvalent elements made of oxides functioning as fining agents in glass are contained at a molar ratio of a predetermined range to $ZrO_2$ in the glass components, clarification reaction due to the valence change of the polyvalent elements can effectively function. Therefore, without As (arsenic) or Sb (antimony) element, a glass substrate for an information recording medium with sufficiently removed gas bubbles can be obtained.

PREFERRED EMBODIMENTS OF THE INVENTION

Preferred embodiments of the present invention will now be described in detail.

(Glass Substrate for an Information Recording Medium)

The glass substrate for an information recording medium of the present invention is made of an aluminosilicate glass containing 60-75% by mass of $SiO_2$, 5-18% by mass of $Al_2O_3$, 3-10% by mass of $Li_2O$, 3-15% by mass of $Na_2O$, and 0.5-8% by mass of $ZrO_2$ with respect to the total glass components. Therefore, chemical strengthening treatment by ion exchange can be applied thereto, whereby enhanced impact resistance and vibration resistance can be ensured. The reason why each component was regulated in the above range is as follows:

$SiO_2$ is a critical component to form a network structure of glass and significantly contributes to chemical resistance. When the content of $SiO_2$ is less than 60% by mass, chemical resistance may be lower. In contrast, in the case of more than 75% by mass, melting temperature is excessively high. Therefore, the content of $SiO_2$ needs to fall in a range of 60-75% by mass. In this range, a range of 60-71% by mass is preferable.

$Al_2O_3$ is a critical component to form a network structure together with $SiO_2$, functioning to enhance not only chemical resistance but also ion exchange performance. When the content of $Al_2O_3$ is less than 5% by mass, chemical resistance and ion exchange performance may be lower. In contrast, in the case of more than 18% by mass, devitrification resistance is lower. Therefore, the content of $Al_2O_3$ needs to fall in a range of 5-18% by mass. In this range, a range of 9-14% by mass is preferable.

$LiO_2$ is a necessary component to carry out chemical strengthening treatment by ion exchange. In the chemical strengthening treatment, $Li^+$ ions in glass are ion-exchanged with $Na^+$ ions or $K^+$ ions contained in a chemical strengthening treatment liquid, whereby a glass substrate is strengthened. When the content of $LiO_2$ is less than 3% by mass, this ion exchange performance is lower. In contrast, in the case of more than 10% by mass, devitrification resistance and chemical resistance are lower. Therefore, the content of $LiO_2$ needs to be 3-10% by mass. In this range, a range of 4-6% by mass is preferable.

$Na_2O$ is a necessary component to carry out chemical strengthening treatment by ion exchange. In the chemical strengthening treatment, $Na^+$ ions in glass are ion-exchanged with $K^+$ ions contained in a chemical strengthening treatment liquid, whereby a glass substrate is strengthened. When the content of $Na_2O$ is less than 3% by mass, this ion exchange performance is decreased and also devitrification resistance is lower. In contrast, in the case of more than 15% by mass, chemical resistance is decreased. Therefore, the content of $Na_2O$ needs to be 3-15% by mass. In this range, a range of 6-10% by mass is preferable.

$ZrO_2$ is a necessary component to enhance chemical resistance. When the content of $ZrO_2$ is less than 0.5% by mass, chemical resistance is lower. In contrast, in the case of more than 8% by mass, devitrification resistance is lower. Therefore, the content of $ZrO_2$ needs to be 0.5-8% by mass. In this range, a range of 1-7% by mass is preferable.

Either $As_2O_3$ or $Sb_2O_3$ is not contained. Herein, "being not contained" refers to exclude intentional addition of those elements as raw materials of glass. Allowable is a trace amount contained to the extent that they are inevitably contained as impurities in raw materials of other components.

The investigation results obtained by the present inventors made it clear that in a glass substrate containing each of the above components, predetermined fining agent was contained at a molar ratio in a predetermined range to $ZrO_2$ in the glass components, whereby without As (arsenic) or Sb (antimony) element, gas bubbles in the glass were sufficiently removed. Namely, the glass substrate for an information recording medium of the present invention contains as fining agent at least one selected from the group consisting of $SO_3$ (sulfurous acid), F (fluorine), Cl (chlorine), Br (bromine), and I (iodine). The molar ratio of the total amount of these fining agents to the amount of $ZrO_2$ in the glass components, which is (the total amount of the fining agents)/$ZrO_2$, falls in a range of 0.05-0.50.

The reason why gas bubbles can be sufficiently removed as described above when predetermined fining agents are contained at a molar ratio in a predetermined range to $ZrO_2$ in the glass components is basically considered as follows.

In general, a fining agent contributes to removing (clarifying) gas bubbles present in molten glass by the following two functions:

(a) The first one of the functions is a function to generate gas in molten glass in the process of raising the temperature of the molten glass. Gas bubbles in the molten glass move upward by the buoyancy thereof to reach the surface of the molten glass, resulting in bursting and disappearance. Herein, the ascending velocity of the gas bubbles in molten glass largely depend on the size of the gas bubbles. Large gas bubbles relatively easily reach the surface due to large ascending velocity thereof. However, small gas bubbles have small ascending velocity, whereby an extremely long time is required to reach the surface. In the process of raising the temperature of molten glass, gas is generated from a fining agent, whereby gas bubbles in the molten glass grow larger and then the ascending velocity of the gas bubbles is increased, resulting in accelerating the disappearance of the gas bubbles.

Any of $SO_3$ (sulfurous acid), F (fluorine), Cl (chlorine), Br (bromine), and I (iodine), which are used in the present invention, has a feature that the solubility is lower at the higher the temperature of the molten glass, and gas is generated in the course of raising the temperature of the molten glass.

(b) The second one of the functions is a function to absorb gas present in molten glass in the process of decreasing the temperature of the molten glass. Any of the aforementioned fining agents has a feature that the solubility is higher at the lower temperature of the molten glass, and the bubbles are absorbed in the molten glass and disappear in the course of decreasing the temperature of the molten glass.

In order to sufficiently remove gas bubbles in molten glass as described above, it is necessary that the generation and absorption of gas by the change in the solubility of the fining agent are effectively carried out. The present inventors conducted diligent investigations, with respect to the aforementioned fining agents, on the phenomenon of the change of the solubility into the molten glass depending on the temperature, and found that the change in solubility was largely affected by the redox reaction of other metal ions, specifically Zr ions coexisting in molten glass. Then, investigations were further conducted, whereby it was found that in an aluminosilicate glass having predetermined components, when the molar ratio of the total amount of the above fining agents to the amount of $ZrO_2$, which is (the total amount of the fining agents)/$ZrO_2$, fell in a range of 0.05-0.50, clarification reaction by the change in solubility was effectively performed.

As the fining agents, at least one type selected from the group consisting of $SO_3$ (sulfurous acid), F (fluorine), Cl (chlorine), Br (bromine), and I (iodine). Only one type of polyvalent element may be used alone, or two or more types may be used together. Of these, $SO_3$ (sulfurous acid) is specifically preferable since it can effectively remove gas bubbles.

When the molar ratio of the total amount of the fining agents to the amount of $ZrO_2$, which is (the total amount of the fining agents)/$ZrO_2$, falls outside a predetermined range, clarification reaction by the valence change is inadequate, whereby it becomes difficult to sufficiently remove gas bubbles in molten glass. Accordingly, the molar ratio to $ZrO_2$ needs to fall in a range of 0.05-0.50, more preferably in a range of 0.1-0.4.

In addition, it is more preferable that the total content of the aforementioned fining agents is at most 1% by mass with respect to the total glass components. When the content of the fining agents is limited to at most 1% by mass, the fining effect sufficiently works, without decreasing devitrification resistance.

Further, the shape of a glass substrate is not specifically limited. However, a disk-shaped substrate having a central hole is common. The size and thickness of a glass substrate are not specifically limited. For example, the outer diameter is 2.5 inches, 1.8 inches, 1 inch, or 0.8 inch and the thickness is 1 mm, 0.64 mm, or 0.4 mm.

(Production Method of a Glass Substrate for an Information Recording Medium)

As described above, in the glass substrate for an information recording medium of the present invention, gas bubbles can be sufficiently removed by the function of predetermined fining agents. Thereby, neither a complex process nor a special apparatus for production is required, whereby production can be carried out using a well-known, common production method.

Usually, it is common that a blank material as the base of a glass substrate for an information recording medium is prepared and thereafter, production is carried out in processes such as inner and outer circumference processing, grinding and polishing processing, chemical strengthening treatment, and cleaning. With regard to the preparation of the blank material, a method of preparation by press molding of molten glass and a method of preparation by cutting sheet glass are known. The inner and outer circumference processing is a process to carry out boring processing of a central hole, grinding processing to form the shape of the inner and outer circumferences and to ensure dimensional accuracy, and polishing process of the inner and outer circumferences. The grinding and polishing processing is a process to carry out grinding processing and polishing processing to satisfy the flatness and the surface roughness of a surface on which a recording layer is formed. Usually, the process is frequently carried out by dividing into some stages such as coarse grinding processing, fine grinding processing, primary polishing processing, and secondary polishing processing. The chemical strengthening treatment is a process to immerse a glass substrate in a chemical strengthening treatment liquid to strengthen the same. And, the cleaning is a process to remove abrasives remaining on the surface of a glass substrate and foreign substances such as a chemical strengthening treatment liquid.

In particular, since the glass substrate for an information recording medium of the present invention is made of aluminosilicate glass containing predetermined glass components, enhanced impact resistance and vibration resistance can be ensured by chemical strengthening treatment. The chemical strengthening treatment is carried out by an ion exchange method in which a glass substrate is immersed in a heated chemical strengthening treatment liquid, whereby lithium ions and sodium ions being components of the glass substrate are exchanged with ions such as sodium ions and potassium ions having larger ion radiuses than these ions. Strain produced by the ion radius difference generates compressive stress in the region where the ions have been exchanged, whereby the surface of the glass substrate is strengthened.

As the chemical strengthening treatment liquid, a molten salt containing sodium ions or potassium ions is commonly used. For example, a nitrate, a carbonate, and a sulfate of sodium or potassium, and a mixed melted salt thereof are cited. Of these, from the viewpoint of low melting point and being able to prevent the deformation of a glass substrate, a mixed molten salt of sodium nitrate ($NaNO_3$) and potassium nitrate ($KNO_3$) is preferably used.

(Information Recording Medium)

An information recording medium can be produced by forming at least a recording layer on the above glass substrate for an information recording medium. The recording medium is not specifically limited, and various types of recording layers utilizing magnetic, optical, or magneto-optical properties are usable. An information recording medium (a magnetic disk), employing a magnetic layer as a recording layer, is especially suitable for production.

Magnetic materials used for such a magnetic layer are not specifically limited, and well-known materials can be appropriately selected and used. However, to realize enhanced retention power, a Co-based alloy containing Co exhibiting large crystal anisotropy as the main component is suitable. In particular, listed are CoPt, CoCr, CoNi, CoNiCr, CoCrTa, CoPtCr, CoNiPt, CoNiCrPt, CoNiCrTa, CoCrPtTa, and CoCrPtSiO. Further, employable is a multi-layer structure (for example, CoPtCr/CrMo/CoPtCr or CoCrPtTa/CrMo/CoCrPtTa) to reduce noise by dividing a magnetic layer by a non-magnetic material (for example, Cr, CrMo, or CrV).

As the magnetic layer, other than the above Co-based materials, ferrite-based or iron-rare-earth-based materials, or granular materials having a structure in which magnetic particles of Fe, Co, CoFe, or CoNiPt are dispersed in a non-magnetic film formed of $SiO_2$ or BN are also usable. The magnetic layer may employ either one of an in-plane type and a vertical type recording format.

As a formation method for a magnetic layer, any appropriate well-known method is usable. For example, cited are a method to spin-coat with a thermally curable resin, in which magnetic particles are dispersed, on a glass substrate for an information recording medium, a sputtering method, and an electroless plating method. From the viewpoint of thinner film and higher density realization of a magnetic layer, the sputtering method or the electroless plating method is preferable.

For a magnetic disk, an underlayer is further provided as appropriate. As materials for the underlayer, non-magnetic metals such as Cr, Mo, Ta, Ti, W, V, B, Al, and Ni are listed. When a magnetic layer contains Co as the main component, from the viewpoint of magnetic characteristic enhancement, a material for the underlayer is preferably single Cr or Cr alloy. Further, the underlayer is not limited to a monolayer and may have a multi-layer structure in which layers formed of the same or different materials are layered. For example, Cr/Cr, Cr/CrMo, Cr/CrV, NiAl/Cr, NiAl/CrMo, and NiAl/CrV are cited.

Further, the surface of a magnetic layer may be provided with a protective layer to prevent abrasion and corrosion of the magnetic layer. As the protective layer, for example, a Cr layer, a Cr alloy layer, a carbon layer, a hydrogenated carbon layer, a $ZrO_2$ layer, and an $SiO_2$ layer are cited. The protective layer may be a monolayer or have a multilayer structure containing layers of the same kind or different kinds. Such a protective layer can continuously be formed using an inline-type sputtering apparatus, together with the underlayer and the magnetic layer. Further, when forming a protective layer of $SiO_2$ layered on a Cr layer is formed, the $SiO_2$ layer may be formed in such a manner that a solution of tetraalkoxysilane diluted with an alcohol-based solvent and therein in which colloidal silica fine particles are dispersed, is coated on a Cr layer and then baked.

Still further, the surfaces of the magnetic layer and the protective layer may be provided with a lubricating layer to improve slipping properties of a magnetic head. As the lubricating layer, examples include a layer of a liquid lubricant containing perfluoropolyether (PFPE) applied and then subjected to a thermal treatment as appropriate.

EXAMPLES

Examples carried out to confirm the advantages of the present invention will now be described without limiting the present invention thereto.

Raw materials were blended according to the glass components shown in Table 1-Table 6 described below. As fining agents, $SO_3$ (Table 1), F (Table 2), Cl (Table 3), Br (Table 4), I (Table 5), and $SO_3$+F (Table 6) each were used. Herein, neither As nor Sb was not contained in any fining agent above.

TABLE 1

|  |  | $SiO_2$ (% by mass) | $Al_2O_3$ (% by mass) | $Li_2O$ (% by mass) | $Na_2O$ (% by mass) | $ZrO_2$ (% by mass) | Fining Agent Type | (% by mass) | (molar ratio) | The Number of Gas Bubbles (number) | Devitrification Properties |
|---|---|---|---|---|---|---|---|---|---|---|---|
| No. 1-1 | Comparative Example | 70.9 | 10.0 | 5.0 | 7.0 | 7.0 | $SO_3$ | 0.14 | ($SO_3/ZrO_2$) = 0.03 | 43 | A |
| No. 1-2 | Example | 70.8 | 10.0 | 5.0 | 7.0 | 7.0 | $SO_3$ | 0.23 | ($SO_3/ZrO_2$) = 0.05 | 0 | A |
| No. 1-3 | Example | 70.2 | 9.9 | 4.9 | 6.9 | 6.9 | $SO_3$ | 1.12 | ($SO_3/ZrO_2$) = 0.25 | 0 | B |
| No. 1-4 | Example | 69.4 | 9.8 | 4.9 | 6.8 | 6.8 | $SO_3$ | 2.22 | ($SO_3/ZrO_2$) = 0.50 | 0 | B |
| No. 1-5 | Comparative Example | 69.1 | 9.7 | 4.9 | 6.8 | 6.8 | $SO_3$ | 2.66 | ($SO_3/ZrO_2$) = 0.60 | 37 | B |
| No. 1-6 | Comparative Example | 62.9 | 14.0 | 6.0 | 10.0 | 7.0 | $SO_3$ | 0.18 | ($SO_3/ZrO_2$) = 0.04 | 36 | A |
| No. 1-7 | Example | 62.9 | 14.0 | 6.0 | 10.0 | 7.0 | $SO_3$ | 0.23 | ($SO_3/ZrO_2$) = 0.05 | 0 | A |
| No. 1-8 | Example | 62.3 | 13.8 | 5.9 | 9.9 | 6.9 | $SO_3$ | 1.12 | ($SO_3/ZrO_2$) = 0.25 | 0 | B |
| No. 1-9 | Example | 61.6 | 13.7 | 5.9 | 9.8 | 6.8 | $SO_3$ | 2.22 | ($SO_3/ZrO_2$) = 0.50 | 0 | B |
| No. 1-10 | Comparative Example | 61.3 | 13.6 | 5.8 | 9.7 | 6.8 | $SO_3$ | 2.66 | ($SO_3/ZrO_2$) = 0.60 | 31 | B |

TABLE 2

|  |  | $SiO_2$ (% by mass) | $Al_2O_3$ (% by mass) | $Li_2O$ (% by mass) | $Na_2O$ (% by mass) | $ZrO_2$ (% by mass) | Fining Agent Type | (% by mass) | (molar ratio) | The Number of Gas Bubbles (number) | Devitrification Properties |
|---|---|---|---|---|---|---|---|---|---|---|---|
| No. 2-1 | Comparative Example | 71.0 | 10.0 | 5.0 | 7.0 | 7.0 | F | 0.03 | (F/$ZrO_2$) = 0.03 | 39 | A |
| No. 2-2 | Example | 71.0 | 10.0 | 5.0 | 7.0 | 7.0 | F | 0.05 | (F/$ZrO_2$) = 0.05 | 2 | A |
| No. 2-3 | Example | 70.8 | 10.0 | 5.0 | 7.0 | 7.0 | F | 0.27 | (F/$ZrO_2$) = 0.25 | 0 | B |
| No. 2-4 | Example | 70.6 | 9.9 | 5.0 | 7.0 | 7.0 | F | 0.54 | (F/$ZrO_2$) = 0.50 | 1 | B |
| No. 2-5 | Comparative Example | 70.5 | 9.9 | 5.0 | 7.0 | 7.0 | F | 0.64 | (F/$ZrO_2$) = 0.60 | 35 | B |
| No. 2-6 | Comparative Example | 63.0 | 14.0 | 6.0 | 10.0 | 7.0 | F | 0.04 | (F/$ZrO_2$) = 0.04 | 43 | A |
| No. 2-7 | Example | 63.0 | 14.0 | 6.0 | 10.0 | 7.0 | F | 0.05 | (F/$ZrO_2$) = 0.05 | 1 | A |
| No. 2-8 | Example | 62.8 | 14.0 | 6.0 | 10.0 | 7.0 | F | 0.27 | (F/$ZrO_2$) = 0.25 | 1 | B |
| No. 2-9 | Example | 62.7 | 13.9 | 6.0 | 9.9 | 7.0 | F | 0.54 | (F/$ZrO_2$) = 0.50 | 1 | B |
| No. 2-10 | Comparative Example | 62.6 | 13.9 | 6.0 | 9.9 | 7.0 | F | 0.64 | (F/$ZrO_2$) = 0.60 | 38 | B |

TABLE 3

|  |  | $SiO_2$ (% by mass) | $Al_2O_3$ (% by mass) | $Li_2O$ (% by mass) | $Na_2O$ (% by mass) | $ZrO_2$ (% by mass) | Fining Agent Type | (% by mass) | (molar ratio) | The Number of Gas Bubbles (number) | Devitrification Properties |
|---|---|---|---|---|---|---|---|---|---|---|---|
| No. 3-1 | Comparative Example | 70.9 | 10.0 | 5.0 | 7.0 | 7.0 | Cl | 0.06 | (Cl/$ZrO_2$) = 0.03 | 44 | A |
| No. 3-2 | Example | 70.9 | 10.0 | 5.0 | 7.0 | 7.0 | Cl | 0.10 | (Cl/$ZrO_2$) = 0.05 | 5 | A |
| No. 3-3 | Example | 70.6 | 9.9 | 5.0 | 7.0 | 7.0 | Cl | 0.50 | (Cl/$ZrO_2$) = 0.25 | 2 | B |
| No. 3-4 | Example | 70.3 | 9.9 | 5.0 | 6.9 | 6.9 | Cl | 1.00 | (Cl/$ZrO_2$) = 0.50 | 4 | B |
| No. 3-5 | Comparative Example | 70.2 | 9.9 | 4.9 | 6.9 | 6.9 | Cl | 1.20 | (Cl/$ZrO_2$) = 0.60 | 30 | B |
| No. 3-6 | Comparative Example | 62.9 | 14.0 | 6.0 | 10.0 | 7.0 | Cl | 0.08 | (Cl/$ZrO_2$) = 0.04 | 37 | A |
| No. 3-7 | Example | 62.9 | 14.0 | 6.0 | 10.0 | 7.0 | Cl | 0.10 | (Cl/$ZrO_2$) = 0.05 | 3 | A |
| No. 3-8 | Example | 62.7 | 13.9 | 6.0 | 9.9 | 7.0 | Cl | 0.50 | (Cl/$ZrO_2$) = 0.25 | 3 | B |
| No. 3-9 | Example | 62.4 | 13.9 | 5.9 | 9.9 | 6.9 | Cl | 1.00 | (Cl/$ZrO_2$) = 0.50 | 4 | B |
| No. 3-10 | Comparative Example | 62.2 | 13.8 | 5.9 | 9.9 | 6.9 | Cl | 1.20 | (Cl/$ZrO_2$) = 0.60 | 32 | B |

TABLE 4

| | | SiO$_2$ (% by mass) | Al$_2$O$_3$ (% by mass) | Li$_2$O (% by mass) | Na$_2$O (% by mass) | ZrO$_2$ (% by mass) | Fining Agent Type | Fining Agent (% by mass) | (molar ratio) | The Number of Gas Bubbles (number) | Devitrification Properties |
|---|---|---|---|---|---|---|---|---|---|---|---|
| No. 4-1 | Comparative Example | 70.9 | 10.0 | 5.0 | 7.0 | 7.0 | Br | 0.14 | (Br/ZrO$_2$) = 0.03 | 26 | A |
| No. 4-2 | Example | 70.8 | 10.0 | 5.0 | 7.0 | 7.0 | Br | 0.23 | (Br/ZrO$_2$) = 0.05 | 4 | A |
| No. 4-3 | Example | 70.2 | 9.9 | 4.9 | 6.9 | 6.9 | Br | 1.12 | (Br/ZrO$_2$) = 0.25 | 2 | B |
| No. 4-4 | Example | 69.4 | 9.8 | 4.9 | 6.8 | 6.8 | Br | 2.22 | (Br/ZrO$_2$) = 0.50 | 1 | B |
| No. 4-5 | Comparative Example | 69.1 | 9.7 | 4.9 | 6.8 | 6.8 | Br | 2.65 | (Br/ZrO$_2$) = 0.60 | 19 | B |
| No. 4-6 | Comparative Example | 62.9 | 14.0 | 6.0 | 10.0 | 7.0 | Br | 0.18 | (Br/ZrO$_2$) = 0.04 | 33 | A |
| No. 4-7 | Example | 62.9 | 14.0 | 6.0 | 10.0 | 7.0 | Br | 0.23 | (Br/ZrO$_2$) = 0.05 | 5 | A |
| No. 4-8 | Example | 62.3 | 13.8 | 5.9 | 9.9 | 6.9 | Br | 1.12 | (Br/ZrO$_2$) = 0.25 | 1 | B |
| No. 4-9 | Example | 61.6 | 13.7 | 5.9 | 9.8 | 6.8 | Br | 2.22 | (Br/ZrO$_2$) = 0.50 | 3 | B |
| No. 4-10 | Comparative Example | 61.3 | 13.6 | 5.8 | 9.7 | 6.8 | Br | 2.65 | (Br/ZrO$_2$) = 0.60 | 29 | B |

TABLE 5

| | | SiO$_2$ (% by mass) | Al$_2$O$_3$ (% by mass) | Li$_2$O (% by mass) | Na$_2$O (% by mass) | ZrO$_2$ (% by mass) | Fining Agent Type | Fining Agent (% by mass) | (molar ratio) | The Number of Gas Bubbles (number) | Devitrification Properties |
|---|---|---|---|---|---|---|---|---|---|---|---|
| No. 5-1 | Comparative Example | 70.8 | 10.0 | 5.0 | 7.0 | 7.0 | I | 0.22 | (I/ZrO$_2$) = 0.03 | 40 | A |
| No. 5-2 | Example | 70.7 | 10.0 | 5.0 | 7.0 | 7.0 | I | 0.36 | (I/ZrO$_2$) = 0.05 | 3 | A |
| No. 5-3 | Example | 69.7 | 9.8 | 4.9 | 6.9 | 6.9 | I | 1.77 | (I/ZrO$_2$) = 0.25 | 2 | B |
| No. 5-4 | Example | 68.5 | 9.7 | 4.8 | 6.8 | 6.8 | I | 3.48 | (I/ZrO$_2$) = 0.50 | 2 | B |
| No. 5-5 | Comparative Example | 68.1 | 9.6 | 4.8 | 6.7 | 6.7 | I | 4.15 | (I/ZrO$_2$) = 0.60 | 37 | B |
| No. 5-6 | Comparative Example | 62.8 | 14.0 | 6.0 | 10.0 | 7.0 | I | 0.29 | (I/ZrO$_2$) = 0.04 | 36 | A |
| No. 5-7 | Example | 62.8 | 13.9 | 6.0 | 10.0 | 7.0 | I | 0.36 | (I/ZrO$_2$) = 0.05 | 4 | A |
| No. 5-8 | Example | 61.9 | 13.8 | 5.9 | 9.8 | 6.9 | I | 1.77 | (I/ZrO$_2$) = 0.25 | 3 | B |
| No. 5-9 | Example | 60.8 | 13.5 | 5.8 | 9.7 | 6.8 | I | 3.48 | (I/ZrO$_2$) = 0.50 | 2 | B |
| No. 5-10 | Comparative Example | 60.4 | 13.4 | 5.8 | 9.6 | 6.7 | I | 4.15 | (I/ZrO$_2$) = 0.60 | 33 | B |

TABLE 6

| | | SiO$_2$ (% by mass) | Al$_2$O$_3$ (% by mass) | Li$_2$O (% by mass) | Na$_2$O (% by mass) | ZrO$_2$ (% by mass) | Fining Agent Type | Fining Agent (% by mass) | (molar ratio) | The Number of Gas Bubbles (number) | Devitrification Properties |
|---|---|---|---|---|---|---|---|---|---|---|---|
| No. 6-1 | Comparative Example | 70.9 | 10.0 | 5.0 | 7.0 | 7.0 | SO$_3$ F | 0.07 0.02 | ((SO$_3$ + F/ZrO$_2$) = 0.03 | 37 | A |
| No. 6-2 | Example | 70.9 | 10.0 | 5.0 | 7.0 | 7.0 | SO$_3$ F | 0.11 0.03 | ((SO$_3$ + F/ZrO$_2$) = 0.05 | 0 | A |
| No. 6-3 | Example | 70.5 | 9.9 | 5.0 | 7.0 | 7.0 | SO$_3$ F | 0.56 0.13 | ((SO$_3$ + F/ZrO$_2$) = 0.25 | 0 | B |
| No. 6-4 | Example | 70.0 | 9.9 | 4.9 | 6.9 | 6.9 | SO$_3$ F | 1.12 0.27 | ((SO$_3$ + F/ZrO$_2$) = 0.50 | 0 | B |
| No. 6-5 | Comparative Example | 69.8 | 9.8 | 4.9 | 6.9 | 6.9 | SO$_3$ F | 1.34 0.32 | ((SO$_3$ + F/ZrO$_2$) = 0.60 | 29 | B |
| No. 6-6 | Comparative Example | 62.9 | 14.0 | 6.0 | 10.0 | 7.0 | SO$_3$ F | 0.09 0.02 | ((SO$_3$ + F/ZrO$_2$) = 0.04 | 40 | A |
| No. 6-7 | Example | 62.9 | 14.0 | 6.0 | 10.0 | 7.0 | SO$_3$ F | 0.11 0.03 | ((SO$_3$ + F/ZrO$_2$) = 0.05 | 0 | A |
| No. 6-8 | Example | 62.6 | 13.9 | 6.0 | 9.9 | 7.0 | SO$_3$ F | 0.56 0.13 | ((SO$_3$ + F/ZrO$_2$) = 0.25 | 0 | B |
| No. 6-9 | Example | 62.1 | 13.8 | 5.9 | 9.9 | 6.9 | SO$_3$ F | 1.12 0.27 | ((SO$_3$ + F/ZrO$_2$) = 0.50 | 0 | B |
| No. 6-10 | Comparative Example | 62.0 | 13.8 | 5.9 | 9.8 | 6.9 | SO$_3$ F | 1.34 0.32 | ((SO$_3$ + F/ZrO$_2$) = 0.60 | 32 | B |

Each raw material was put into a melting furnace heated at 900° C.-1300° C., followed by melting, clarification, and homogenization by stirring, and then the resulting molten glass was press-molded to prepare a blank material. Thereafter, by inner and outer circumference processing, as well as grinding and polishing processing, a glass substrate having an outer diameter of 65 mm, an inner diameter of 20 mm, and a thickness of 0.635 mm was produced.

With regard to each of the thus-produced glass substrates, the number of residual gas bubbles and devitrification properties during melting were evaluated. The evaluation of the number of residual gas bubbles was conducted in such a manner that the number of gas bubbles per glass substrate was counted with respect to the entire surface of a glass substrate by using an optical microscope of a magnification of 50. The evaluation of the devitrification properties was conducted by judging the numerical value of the difference $\Delta T$ (° C.) between $T_{log\ \eta=2.5}$ (° C.) and $T_L$ (° C.) ($\Delta T = T_{log\ \eta=2.5} - T_L$), where a temperature at which the melting viscosity of a glass satisfies the expression of $\log \eta = 2.5$ is $T_{log\ \eta=2.5}$ (° C.) and the liquid-phase temperature is $T_L$ (° C.). When the relationship 150° C.≤$\Delta T$ was satisfied, the evaluation result was the best (A). When the relationship 50° C.≤$\Delta T$<150° C. was satisfied, the evaluation result was good (B). When the relationship $\Delta T$<50° C. was satisfied, the evaluation result was problematic (C). Herein, the liquid-phase temperature $T_L$ refers to a temperature at which generation of devitrified substances has been observed on the surface of or in the interior of a glass after being kept melting at 1550° C. for two hours followed by being kept in a temperature gradient furnace for ten hours with a temperature gradient and rapidly cooled. Further, $T_{log\ \eta=2.5}$ refers to a temperature at which equation $\log \eta = 2.5$ was held when the viscosity of a molten glass is determined using a stirring viscometer. The evaluation results each are collectively shown in Table 1-Table 10.

The evaluation results confirmed that in Examples of the present invention in which predetermined fining agent made was contained such that the molar ratio to $ZrO_2$ in the glass components fell in a predetermined range, the number of residual gas bubbles was remarkably smaller than in Comparative Examples which are out of the scope of the present invention, and a glass substrate for an information recording medium with sufficiently removed gas bubbles was obtained. Further, when the total content of fining agents was at most 1% by mass with respect to the total glass components, the devitrification properties were confirmed to be excellent.

The invention claimed is:

1. A glass substrate for an information recording medium made of aluminosilicate glass containing 60% to 75% by mass of $SiO_2$, 5% to 18% by mass of $Al_2O_3$, 3% to 10% by mass of $Li_2O$, 3% to 15% by mass of $Na_2O$, and 0.5% to 8% by mass of $ZrO_2$ with respect to whole glass components, and containing neither As (arsenic) element nor Sb (antimony) element, comprising:

a fining agent comprising $SO_3$ (sulfurous acid), wherein a molar ratio of a whole amount of the fining agent to the $ZrO_2$, which is (the whole amount of the fining agent)/$ZrO_2$, is within a range of 0.05 to 0.50, and wherein a total content of the fining agent is 1% by mass or less with respect to the whole glass components.

2. The glass substrate for an information recording medium of claim 1, wherein the glass substrate for an information recording medium is chemically strengthened by ion exchange.

* * * * *